US010760495B2

(12) United States Patent
Hawie et al.

(10) Patent No.: US 10,760,495 B2
(45) Date of Patent: Sep. 1, 2020

(54) FLUID MANIFOLD FOR GAS TURBINE ENGINE AND METHOD FOR DELIVERING FUEL TO A COMBUSTOR USING SAME

(71) Applicant: PRATT & WHITNEY CANADA CORP., Longueuil (CA)

(72) Inventors: Eduardo David Hawie, Woodbridge (CA); Nigel Caldwell Davenport, Hillsburgh (CA); Jian-Ming Zhou, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 106 days.

(21) Appl. No.: 15/975,895

(22) Filed: May 10, 2018

(65) Prior Publication Data

US 2018/0258861 A1 Sep. 13, 2018

Related U.S. Application Data

(62) Division of application No. 14/135,655, filed on Dec. 20, 2013, now Pat. No. 9,995,220.

(51) Int. Cl.
F02C 7/22 (2006.01)
(52) U.S. Cl.
CPC .................... F02C 7/222 (2013.01)
(58) Field of Classification Search
CPC ......................................... F02C 7/222
See application file for complete search history.

(56) References Cited

U.S. PATENT DOCUMENTS

| 2,037,400 | A |   | 4/1936  | Tschierschwitz |          |
|-----------|---|---|---------|----------------|----------|
| 2,541,108 | A |   | 2/1951  | Sforzini       |          |
| 2,686,401 | A |   | 8/1954  | Newcomb        |          |
| 3,037,552 | A | * | 6/1962  | Foulon         | F02C 7/232 |
|           |   |   |         |                | 239/571  |
| 3,102,392 | A | * | 9/1963  | Bauger         | F23R 3/20 |
|           |   |   |         |                | 60/765   |
| 3,213,523 | A | * | 10/1965 | Boehler        | F23R 3/00 |
|           |   |   |         |                | 29/890.11 |
| 3,434,289 | A | * | 3/1969  | Vedova         | F23R 3/28 |
|           |   |   |         |                | 60/232   |
| 4,027,473 | A |   | 6/1977  | Baker          |          |
| 4,305,255 | A |   | 12/1981 | Davies et al.  |          |
| 4,402,184 | A |   | 9/1983  | Faulkner et al.|          |
| 4,467,610 | A |   | 8/1984  | Pearson et al. |          |

(Continued)

Primary Examiner — Ted Kim
(74) Attorney, Agent, or Firm — Norton Rose Fulbright Canada LLP

(57) ABSTRACT

A method for delivering fuel to a combustor of a gas turbine engine includes: injecting fuel into a conduit of a fuel manifold; directing the fuel through a continuous first portion of the conduit; directing the fluid from the first portion into an inflexion of the conduit being a single exit of the first portion; directing the fuel from the inflexion into a second portion of the conduit in serial flow communication with the first portion; and carrying the fuel in the second portion in a direction different from that of the fuel in the first portion. As the fuel flows through the second portion of the conduit, the fuel exits from the second portion of the conduit into a plurality of fuel injection nozzles in exclusive fluid flow communication with the second portion for ejection into a combustor of the gas turbine engine.

4 Claims, 9 Drawing Sheets

(56) References Cited

U.S. PATENT DOCUMENTS

| | | | |
|---|---|---|---|
| 4,492,563 A * | 1/1985 | Reinhold | F23D 14/34 239/558 |
| 4,499,735 A * | 2/1985 | Moore | F02C 7/228 60/739 |
| 4,817,389 A | 4/1989 | Holladay et al. | |
| 4,862,693 A * | 9/1989 | Batakis | F02C 7/222 60/739 |
| 4,903,478 A | 2/1990 | Seto et al. | |
| 5,036,657 A | 8/1991 | Seto et al. | |
| 5,167,122 A | 12/1992 | Shekleton | |
| 5,168,698 A | 12/1992 | Peterson et al. | |
| 5,197,288 A * | 3/1993 | Newland | F02C 7/222 60/734 |
| 5,205,116 A | 4/1993 | Ng | |
| 5,211,005 A | 5/1993 | Hovnanian | |
| 5,226,287 A | 7/1993 | Ng | |
| 5,231,833 A | 8/1993 | MacLean et al. | |
| 5,289,685 A | 3/1994 | Hoffa | |
| 5,303,542 A | 4/1994 | Hoffa | |
| 5,321,949 A | 6/1994 | Napoli et al. | |
| 5,388,398 A | 2/1995 | Kadambi et al. | |
| 5,402,634 A | 4/1995 | Marshall | |
| 5,653,109 A | 8/1997 | Overton et al. | |
| 5,884,483 A | 3/1999 | Munro | |
| 5,927,067 A | 7/1999 | Hanloser et al. | |
| 6,189,321 B1 | 2/2001 | Banhardt et al. | |
| 6,240,732 B1 | 6/2001 | Allan | |
| 6,513,334 B2 | 2/2003 | Varney | |
| 6,857,272 B2 | 2/2005 | Summerfield et al. | |
| 7,530,231 B2 | 6/2009 | Prociw et al. | |
| 7,654,088 B2 | 2/2010 | Shafique et al. | |
| 7,665,309 B2 | 2/2010 | Parker et al. | |
| 7,703,289 B2 | 4/2010 | Rudrapatna et al. | |
| 7,765,808 B2 | 8/2010 | Fish et al. | |
| 7,775,047 B2 | 8/2010 | Fish et al. | |
| 7,942,002 B2 | 5/2011 | Fish | |
| 8,033,113 B2 | 10/2011 | Patel et al. | |
| 8,096,130 B2 | 1/2012 | Morenko | |
| 8,146,365 B2 | 4/2012 | Shum et al. | |
| 8,234,873 B2 | 8/2012 | Houtman et al. | |
| 9,316,154 B2 | 4/2016 | Twardochleb et al. | |
| 2003/0010030 A1 | 1/2003 | Oikawa et al. | |
| 2005/0097895 A1 | 5/2005 | Kothnur et al. | |
| 2005/0160738 A1 | 7/2005 | Fish et al. | |
| 2005/0188699 A1 * | 9/2005 | Shafique | F02C 7/222 60/739 |
| 2005/0241318 A1 | 11/2005 | Buehman et al. | |
| 2006/0218926 A1 * | 10/2006 | Prociw | F02C 7/14 60/739 |
| 2007/0044765 A1 | 3/2007 | Lincourt | |
| 2007/0157616 A1 | 7/2007 | Hernandez et al. | |
| 2007/0204622 A1 | 9/2007 | Patel et al. | |
| 2008/0016869 A1 | 1/2008 | Fish et al. | |
| 2008/0072599 A1 | 3/2008 | Morenko et al. | |
| 2008/0083223 A1 | 4/2008 | Prociw et al. | |
| 2008/0083225 A1 | 4/2008 | Fish et al. | |
| 2008/0092545 A1 | 4/2008 | Fish et al. | |
| 2009/0120522 A1 | 5/2009 | Ziaei et al. | |
| 2009/0256003 A1 * | 10/2009 | McMasters | B23P 6/007 239/128 |
| 2009/0277182 A1 | 11/2009 | Engelbrecht et al. | |
| 2010/0050645 A1 | 3/2010 | Haggerty | |
| 2010/0146928 A1 | 6/2010 | Morenko et al. | |
| 2010/0162709 A1 | 7/2010 | Morgan | |
| 2010/0229555 A1 | 9/2010 | Olver | |
| 2010/0281881 A1 | 11/2010 | Morenko | |
| 2011/0072826 A1 | 3/2011 | Narra et al. | |
| 2012/0122043 A1 | 5/2012 | Siewert et al. | |
| 2012/0174591 A1 | 7/2012 | Hase et al. | |
| 2012/0227410 A1 | 9/2012 | Williams et al. | |
| 2012/0304662 A1 | 12/2012 | Prociw et al. | |
| 2013/0199200 A1 | 8/2013 | Hoke et al. | |
| 2013/0219915 A1 | 8/2013 | Prociw et al. | |
| 2013/0247574 A1 | 9/2013 | Patel et al. | |
| 2013/0340436 A1 | 12/2013 | Abreu | |
| 2013/0340438 A1 | 12/2013 | Abreu | |
| 2014/0137558 A1 | 5/2014 | Toronto | |
| 2014/0238041 A1 | 8/2014 | Crothers et al. | |
| 2014/0250907 A1 | 9/2014 | Twardochleb et al. | |
| 2015/0000299 A1 | 1/2015 | Zuo et al. | |
| 2015/0027126 A1 | 1/2015 | Berry | |
| 2015/0107256 A1 | 4/2015 | Prociw et al. | |
| 2015/0121883 A1 | 5/2015 | Wolfe et al. | |
| 2015/0322862 A1 | 11/2015 | Fuller et al. | |
| 2016/0108818 A1 | 4/2016 | Fletcher et al. | |
| 2016/0201562 A1 | 7/2016 | Chasse et al. | |
| 2016/0201917 A1 | 7/2016 | Dautova et al. | |
| 2016/0230998 A1 | 8/2016 | Fish | |
| 2016/0245524 A1 | 8/2016 | Hill | |
| 2016/0258360 A1 | 9/2016 | Sheil et al. | |

\* cited by examiner

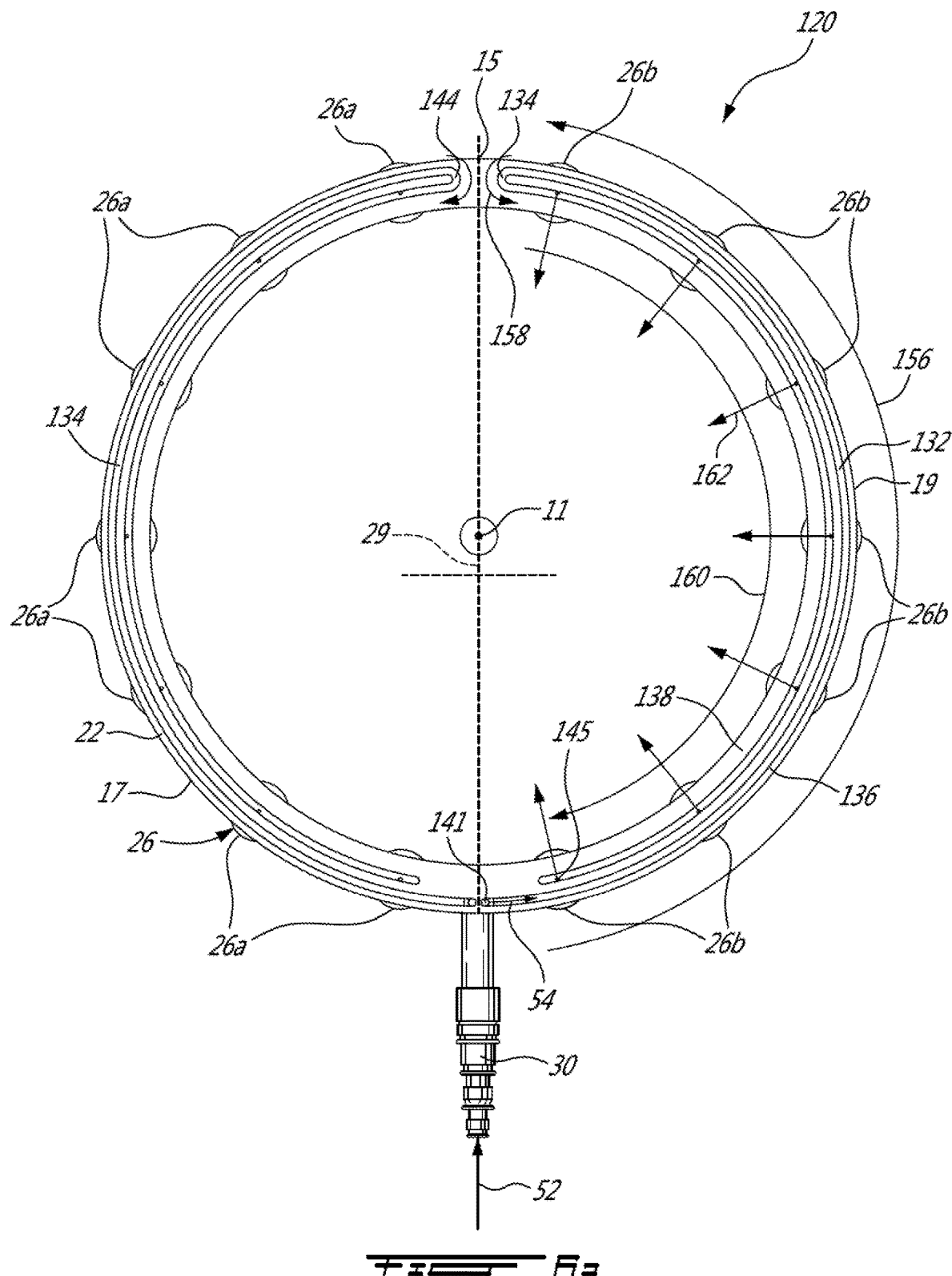

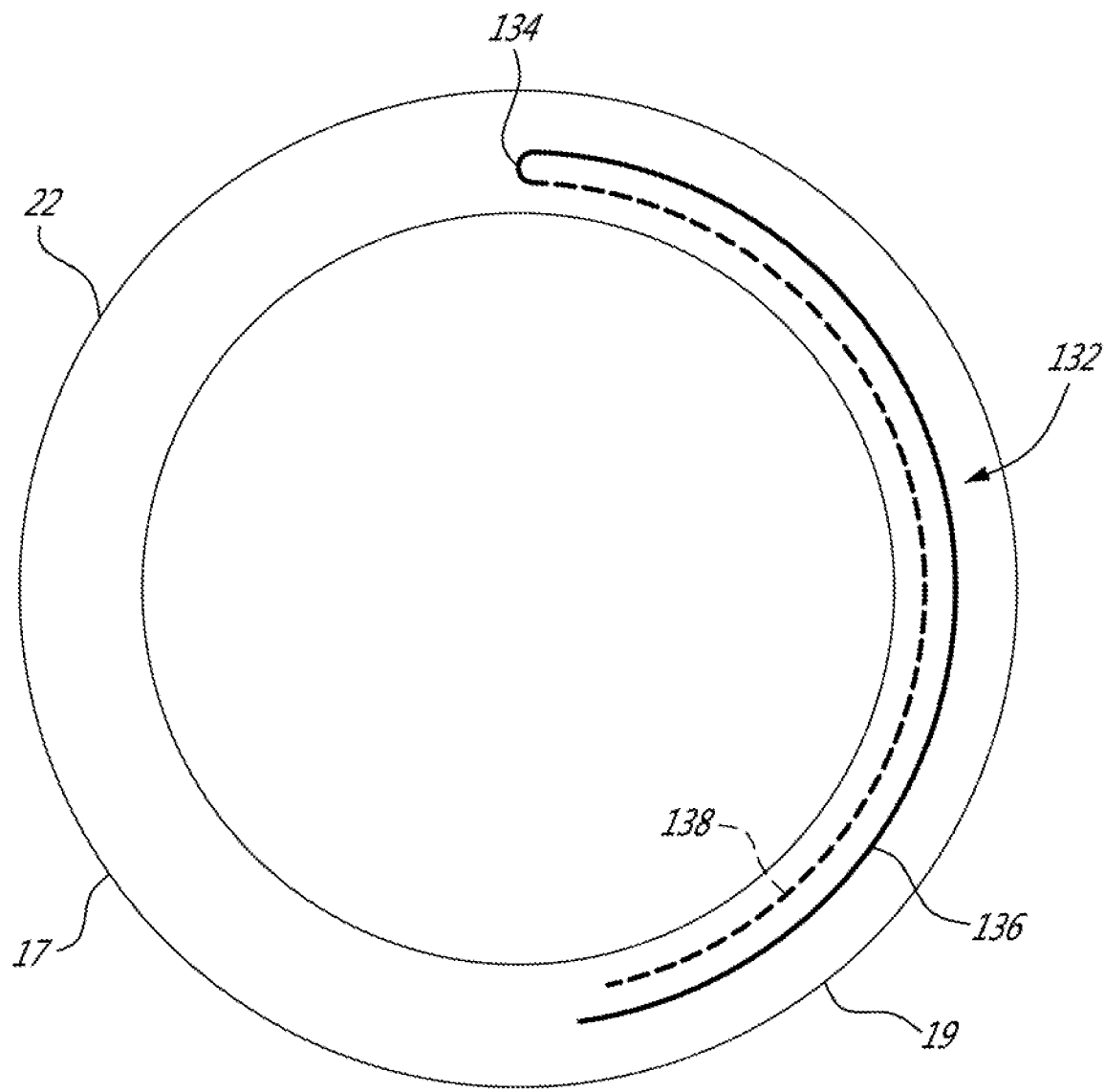

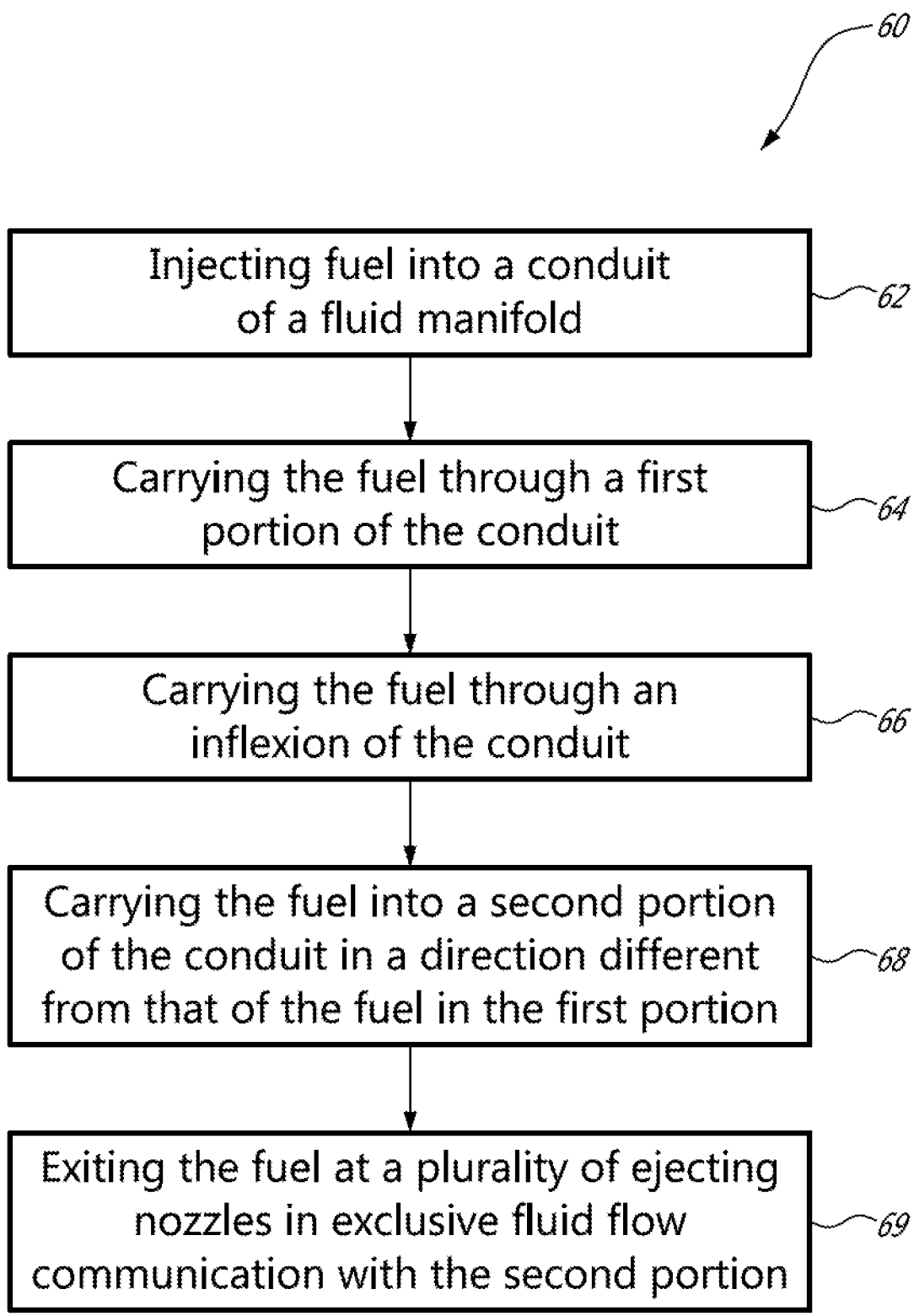

FLUID MANIFOLD FOR GAS TURBINE ENGINE AND METHOD FOR DELIVERING FUEL TO A COMBUSTOR USING SAME

CROSS-REFERENCE TO RELATED APPLICATIONS

The present application is a divisional of U.S. patent application Ser. No. 14/135,655 filed Dec. 20, 2013, now U.S. Pat. No. 9,995,220, the entire content of which is incorporated herein by reference.

TECHNICAL FIELD

The application relates generally to gas turbine engines and, more particularly, to fuel manifolds for gas turbine engines.

BACKGROUND OF THE ART

Fuel conveying passages, conduits, and manifolds employed internally within gas turbine engines and other high-temperature equipment are exposed to high temperatures, particularly those located adjacent the combustor. Internal fuel manifolds are particularly exposed to high temperatures given their proximity to the combustor. While the fuel flowing through such internal fuel manifolds provides some cooling, as the fuel is injected into the combustor, and thus the volume of fuel flowing through the manifold decreases, those portions of the manifold furthest away from the fuel inlet are more prone to overheating. If temperatures get too high, fuel tends to decompose within these fuel conveying passages causing undesirable accumulations of carbon or coke, which can lead to poor combustor fuel distribution which is detrimental to the life of the engine.

SUMMARY

In one aspect, there is provided a fuel manifold of gas turbine engine, the manifold comprising: a ring-shaped fuel conveying body; a plurality of fuel injection nozzles on the body; and at least two fuel conduits defined within the body, each of the fuel conduits being fluidly connected to a respective separate group of the fuel injection nozzles, each of the fuel conduits extending from a conduit inlet to a conduit end, each of the fuel conduits including: a first portion extending continuously between the conduit inlet and an inflexion of the conduit, the inflexion being a single exit of the first portion such that fuel flows uninterrupted between the conduit inlet and the inflexion; and a second portion downstream of the first portion and connected thereto in serial flow communication, the second portion extending between the inflexion and the conduit end, the respective separate group of fuel injection nozzles of the fuel conduit fluidly communicating exclusively with the second portion of the fuel conduit.

In another aspect, there is provided a method for delivering fuel to a combustor of a gas turbine engine, the method comprising: injecting fuel into a conduit of a fuel manifold; directing the fuel through a continuous first portion of the conduit; directing the fluid from the first portion into an inflexion of the conduit being a single exit of the first portion; directing the fuel from the inflexion into a second portion of the conduit in serial flow communication with the first portion; carrying the fuel in the second portion in a direction different from that of the fuel in the first portion; and as the fuel flows through the second portion of the conduit, exiting the fuel from the second portion of the conduit into a plurality of fuel injection nozzles in exclusive fluid flow communication with the second portion for ejection into a combustor of the gas turbine engine.

In a further aspect, there is provided a method for delivering fuel to a combustor of a gas turbine engine, the method comprising: injecting fuel into two conduits of a fuel manifold; for each of the two conduits: directing the fuel through a continuous first portion of the conduit; directing the fluid from the first portion into an inflexion of the conduit being a single exit of the first portion; directing the fuel from the inflexion into a second portion of the conduit in serial flow communication with the first portion; carrying the fuel in the second portion in a direction different from that of the fuel in the first portion; and as the fuel flows through the second portion of each of the conduits, exiting the fuel from the second portion into a plurality of respective separate group of fuel injection nozzles in exclusive fluid flow communication with the second portion for ejection into a combustor of the gas turbine engine.

In this specification, the term "inflexion" is defined as an area of a fluid conduit defined between two portions of the conduit where the flow in the portion upstream of the inflexion has a direction different relative from that of the flow in the portion downstream of the inflexion. Non-limitative examples of inflexions include a local maximum of a conduit, a local minimum of a conduit, a turn of a conduit, or an elbow of a conduit.

DESCRIPTION OF THE DRAWINGS

Reference is now made to the accompanying figures in which:

FIG. 4b is a schematic of FIG. 4a showing only one internal passage;

FIG. 6a is a rear elevation view of the fuel manifold partially cut-out of FIG. 5;

FIG. 6b is a schematic of FIG. 6a showing only one internal passage; and

FIG. 7 is a flow chart of a method for delivering fuel to a combustor of the gas turbine of FIG. 1 using any embodiment the fuel manifold of FIGS. 2 to 6.

DETAILED DESCRIPTION

Figure 1:
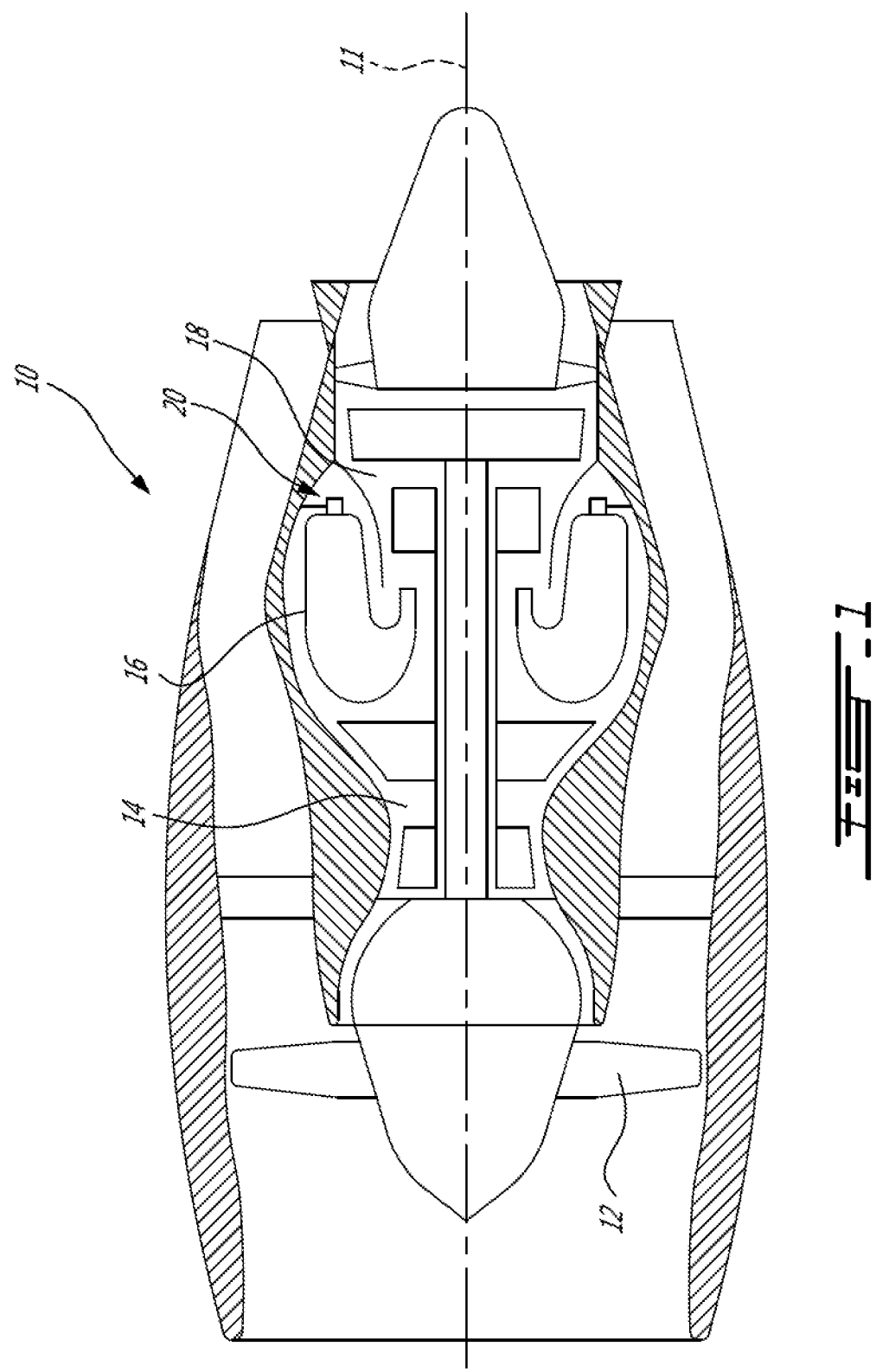
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Fuel is injected into the combustor 16 of the gas turbine engine 10 by a fuel system 20 which includes a fuel source (not shown) and at least one fuel conveying member which is operable to inject fuel into the combustor 16 for mixing with the compressed air from the compressor 14 and ignition of the resultant mixture. The fan 12, compressor 14, combustor 16, and turbine 18 are preferably all concentric about a common central longitudinal axis 11 of the gas turbine engine 10.

Figure 2:
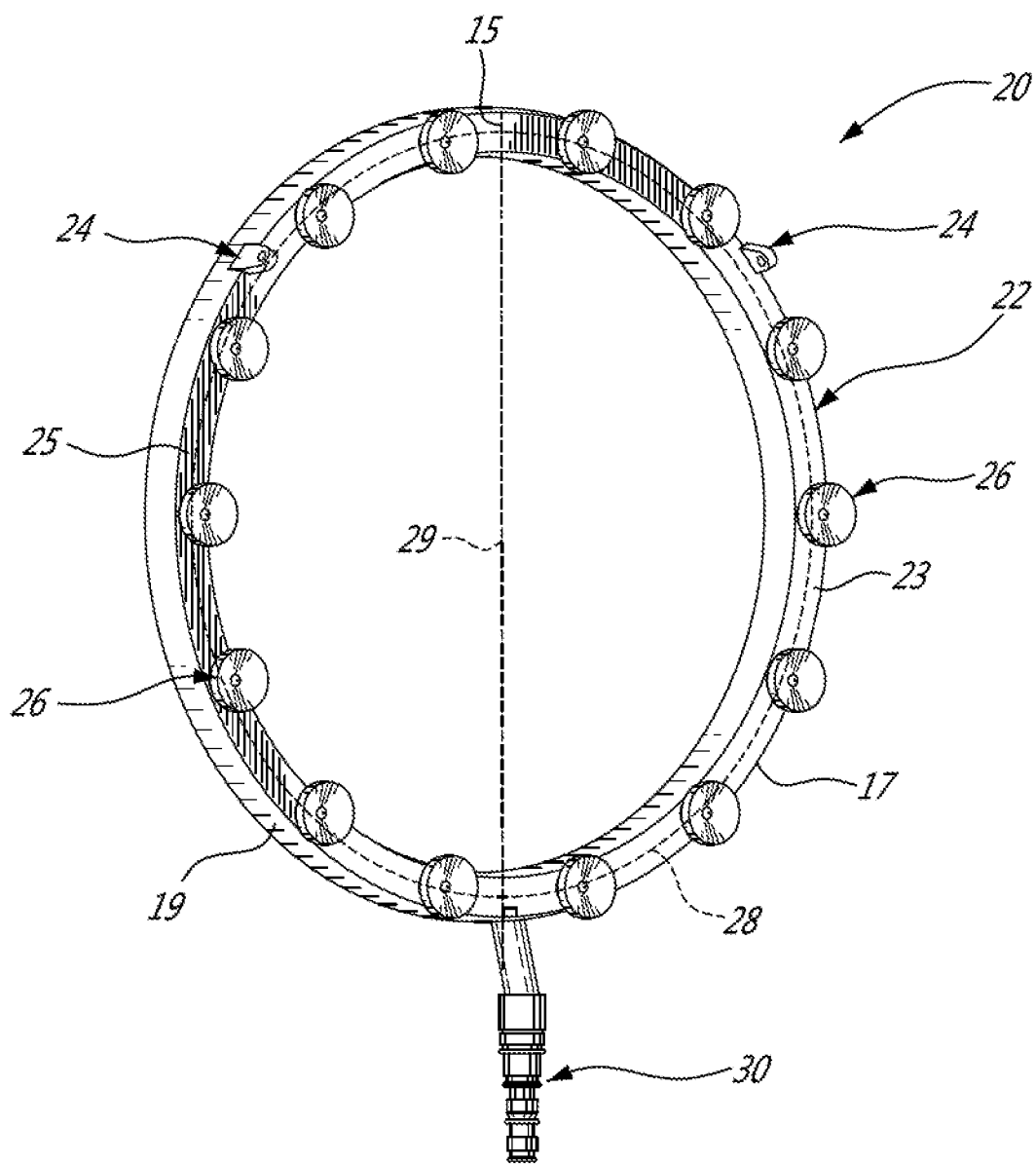
FIG. 2 is a front perspective view of a fuel manifold for use in a gas turbine engine such as that depicted in FIG. 1.

Referring to FIG. 2, the at least one fuel conveying member of the fuel injection system 20 includes an annular internal fuel manifold 22 having an inlet 30 which is connected to the fuel source. Fuel enters the fuel manifold 22 at the fuel inlet 30 and is distributed within the manifold 22, in the manner as will be described in further detail below, before being ejected through a plurality of ejection nozzles 26. Although the fuel manifold 22 is shown herein to have a single inlet 30, it is contemplated that the fuel 22 could have two or more inlets 30.

The fuel manifold 22 is mounted in place adjacent to the combustor 16 via suitable mounting elements, which may in one possible embodiment include several integral attachment lugs 24. The attachment lugs 24 receive pins (not shown) engaged to the support structure. The mounting elements may allow for thermal expansion of the fuel manifold 22 at high temperatures. It is contemplated that the fuel manifold 22 could be mounted to a support structure surrounding the combustor 16. For example, the fuel manifold 22 could be mounted to the engine case. It is also contemplated that the fuel manifold 22 could be mounted by ways other than the attachment lugs 24. For example, Using fasteners, welds, or the like, which engage the fuel manifold in place to one or more of the combustor, the surrounding gas generator casing, etc.

The fuel manifold 22 has a ring-shaped body 23. It is contemplated that the fuel manifold 22 could have shapes other than a ring. For example, the fuel manifold 22 could be a half ring or another arcuate shape. The body 23 is covered by an outer heat shield which provides the fuel manifold 22 thermal protection from the high temperature environment of the combustor 16. It is contemplated that the outer heat shield could be omitted. The fuel manifold 22 is symmetric with respect to an axis 29. For purposes of orientation, the axis 29 in this specification will be defined as a vertical axis. The vertical axis 29 defines two portions of the fuel manifold 22, namely a right side 17 and a left side 19 or orientation purposes, a bottom 21 of the manifold ring 22 is defined herein to be at a location of the inlet 30 on the fuel manifold 22, and a top 15 is defined herein to be a location of the fuel manifold 22 opposite to the inlet 30 along the vertical axis 29, and which corresponds to a highest point of the fuel manifold 22. The top 15 and bottom 21 thereby define upward and downward orientations for purposes of orientation in this specification.

The plurality of fuel injection nozzles 26 (fourteen in the embodiment shown in FIG. 2) is provided on a front face 25 of the ring-shaped body 23. The fuel injection nozzles 26 atomize the fuel as it is injected into the combustor 16 for ignition when mixed with the compressed air therein. In the depicted embodiment, the injection nozzles 26 are disposed at equidistance form each other along a circumference 28 of the ring-shaped body 23. Nonetheless it is possible to provide circumferentially spaced apart groups of fuel injection nozzles, in which case the spacing between fuels nozzles may not be equal throughout the circumference 28 of the fuel manifold 22. The fuel injection nozzles 26 as described herein may be gas turbine engine fuel injection nozzles as described, for example, in U.S. Pat. Nos. 7,530, 231 and 6,082,113, the entire contents of which are incorporated herein by reference. It is contemplated that the fuel manifold 22 could have more or less than fourteen injection nozzles 26. It is also contemplated that the injection nozzles 26 could span only a portion of the circumference 28 of fuel manifold 22.

Figure 3:
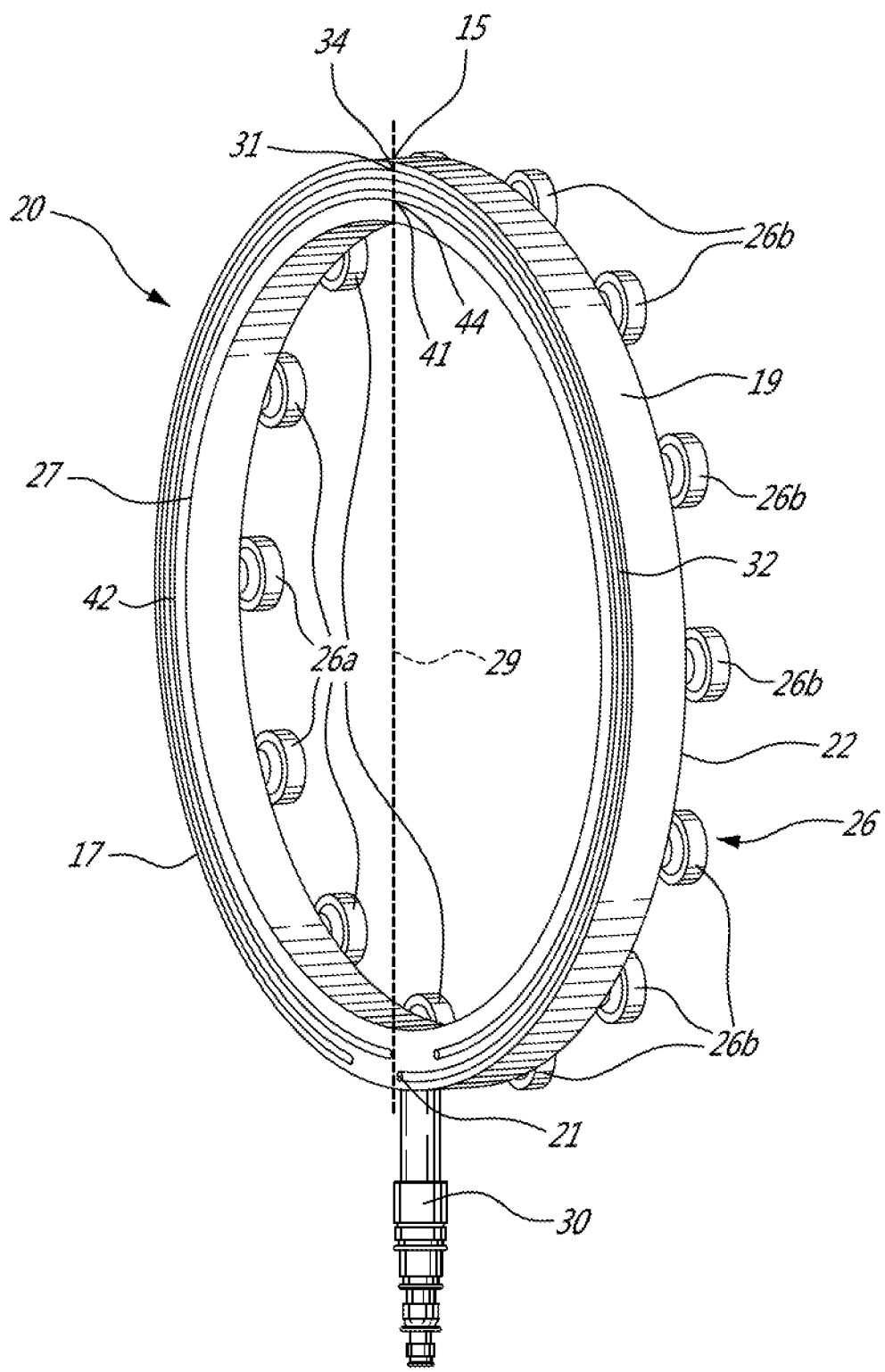
FIG. 3 is a rear perspective view of the fuel manifold of FIG. 2 partially cut-out to reveal conduits of the fuel manifold according to a first embodiment.

Turning now to FIG. 3, a rear face 27 of the fuel manifold 22 is shown cut off to reveal a first embodiment of conduits (or internal passages) 32, 42 of the body 23. The conduits 32, 42 carry fuel from the inlet 30 to the injection nozzles 26.

The body 23 includes two concentric conduits 32, 42, the conduit 42 being disposed inwardly of the conduit 32. Each of the conduits 32, 42 is ring-shaped and runs through almost the entire circumference 28 of the fuel manifold 22 (i.e. right side 17 and left side 19). It is contemplated that one or both of the conduits 32, 42 could run on only a portion of the circumference 28 of the fuel manifold 22. A top 31, 41 of the conduits 32, 42 corresponds to the top 15 of the body 23, which is also a location furthest away from the fuel inlet 30. The tops 31, 41 of the conduits 32, 42 are inflexions 34, 44 of the conduits 32, 42. This means that at the tops 31, 41 are local maximums of the conduits 32, 42.

The conduits 32, 42 are fluidly independent from one another, and carry fuel from the inlet 30 each to a different group of injection nozzles 26. The conduit 32 distributes fuel to nozzles 26a on the right side 17 of the body 23 exclusively, and the conduit 42 distributes fuel to nozzles 26b on the left side 19 of the body 23 exclusively. The conduits 32, 42 being similar to each other, only the conduit 32 will now be described in further detail.

Figure 4A:
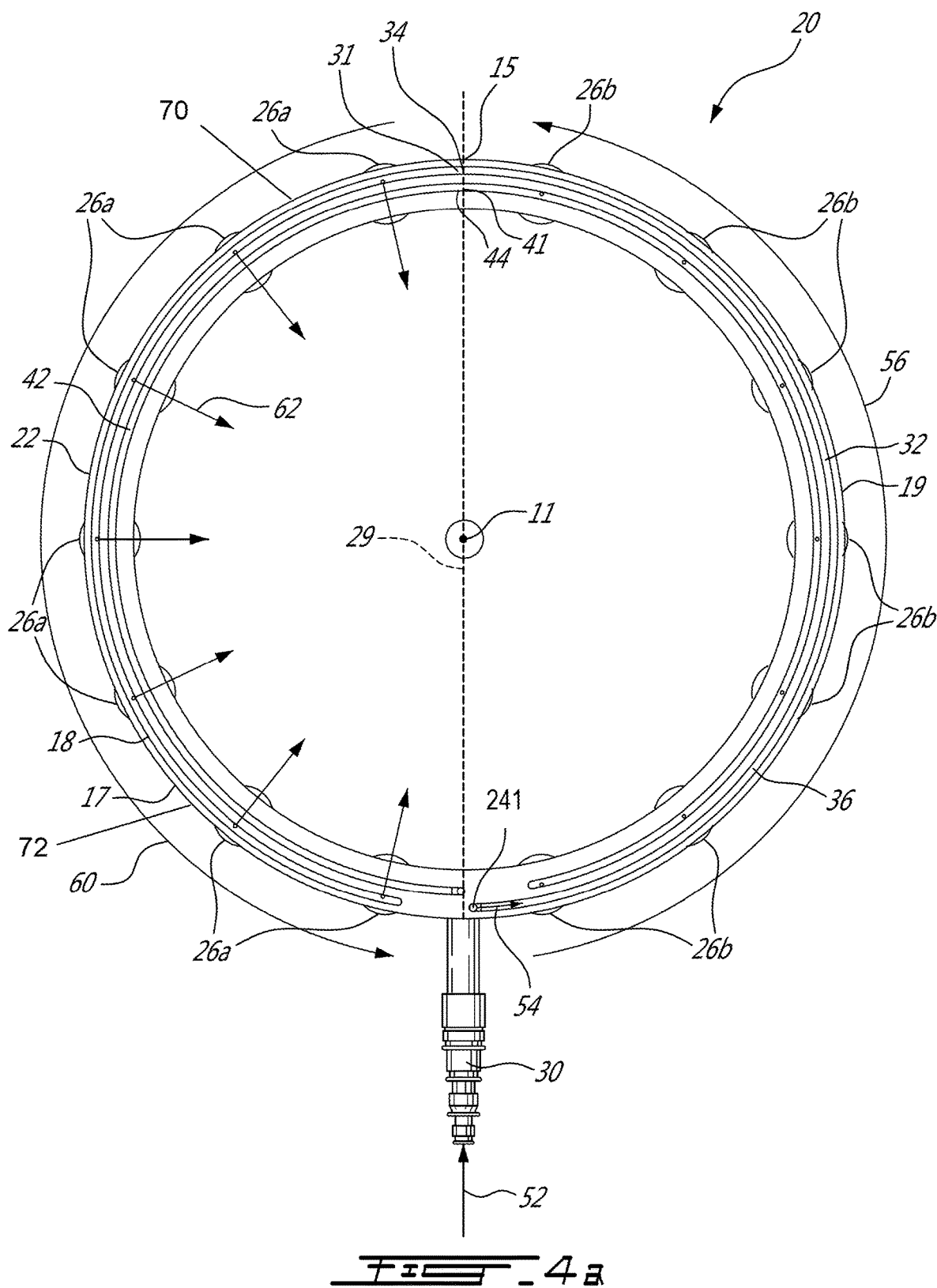
FIG. 4a is a rear elevation view of the fuel manifold partially cut-out of FIG. 3.

With reference to FIGS. 4a and 4b, the conduit 32 includes a first portion 36 (shown solid in FIG. 4b) disposed on the left side 19 of the body 23, and a second portion 38 (shown dotted in FIG. 4b) disposed on the right side 17 of the body 23 and in fluid flow communication with the first portion. The first and second portions 36, 38 are connected to each other by the inflexion 34. The first portion 36 extends arcuately (i.e. it has an arcuate shape) from an inlet end 241 proximal to the inlet 30 up to the inflexion 34, and runs through almost the entire left side 19 of the body 23. The inlet end 241 is a lowest point of the conduit 32 and is disposed opposite to the inflexion 34 on the vertical axis 29. It is contemplated that the inlet end 241 and the inflexion 34 could not be opposite to each other. For example, the end 241 could be at about 15 degrees from the vertical axis 29. It is also contemplated that the inlet end 241 or the inflexion 34 could not be disposed on or about the vertical axis 29. A cross-section of the first portion 36 of the conduit 30 is constant along a length of the first portion 36 from the inlet end 241 to the inflexion 34. It is however contemplated that the cross-section of the first portion 36 could vary as long as the fuel would reach the inflexion 34 so as to feed the second portion 38. Although the first portion 36 has a circular cross-section, it is contemplated that the first portion 36 could have a square, rectangular or oval cross-section.

Fuel travels upwardly in the first portion 36 (indicated by arrow 56) until it reaches the inflexion 34 and the second portion 38. The first portion 36 is not directly connected to any of the injection nozzles 26a of the right side 17 to which the conduit 32 delivers fuel. Instead, all the fuel entering the first portion 36 exits the first portion 36. Fuel flowing in the first portion 36 of the conduit 32 cools the body 23 before it reaches the downstream second portion 38 and the injection nozzles 26a. By circulating the fuel through the manifold 22 by prior to injecting any of the fuel provides improved cooling of the manifold 22, which, in turn, avoids high wetted wall and fuel temperatures.

The second portion 38 extends between the inflexion 34 and a conduit end 45 of the conduit 32, and runs through the entire right side 17 of the body 23. The fuel traveling in the second portion 38 travels downwardly (as indicated by arrow 60). The inflexion 34 provides a change of direction of the flow, and flow in the second portion 38 is in a direction opposite from the flow in the first portion 36. The second portion 38 is exclusively connected to the injection nozzles 26a that are disposed on the right side 17 of the body 23. In the embodiment shown herein, the second portion 38 is connected to seven injection nozzles 26. Enough fluid has to be provided to the second portion 38 of the conduit 32 so that every injection nozzle 26a on the right side 17 is fed with an adequate amount of fuel. The injection nozzles 26a expel the fuel to the combustor 16 (arrows 62, only one being referred to avoid cluttering the drawings). The fuel injected in the conduit 32 can't access the injection nozzles 26a of the right side 17 until the fuel has flown through the first portion 36 and changed direction from upward to downward at the inflexion 34. The fuel injected in the conduit 32 does not access any of the injection nozzles 26b of the left side 19, as those are fed by the conduit 42 exclusively.

Figures 4C, 4D:
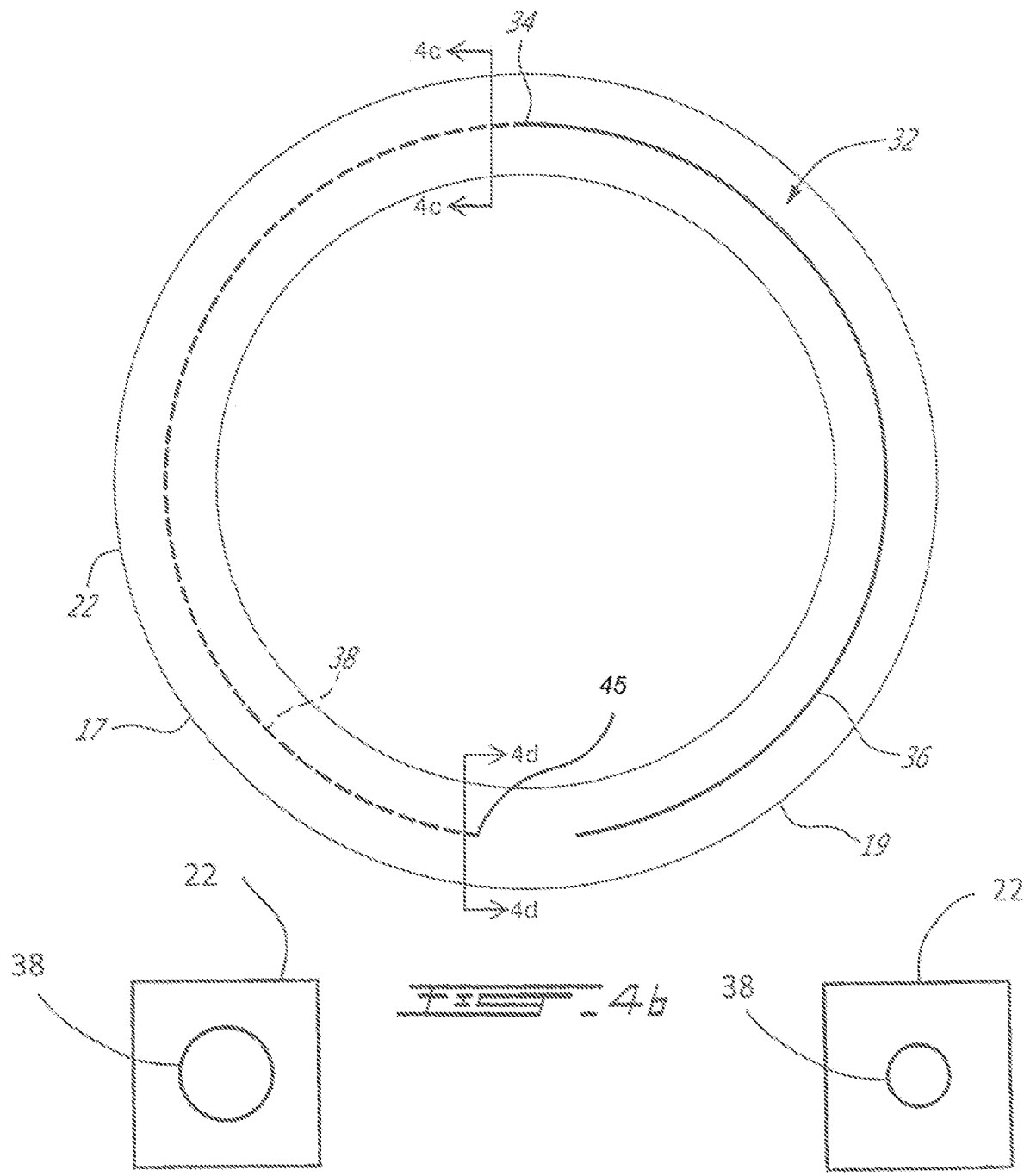
FIG. 4c is a schematic view of a cross-section of the internal passage along line 4c-4c of FIG. 4b.
FIG. 4d is a schematic view of a cross-section of the internal passage along line 4d-4d of FIG. 4b.

In order to ensure that the fuel reaches each of the fuel injection nozzles 36 at a desired velocity, a cross-section flow area of the second portion 38 of the conduit 32 may decrease along a length of the second portion 38 from the inflexion 34 to the conduit end 45, as can be seen in FIGS. 4b, 4c and 4d. This decrease in cross-section flow area of the second portion 38, which may be continuous and gradual, is designed to maintain the velocity of the fuel substantially constant through the second portion 38. In the embodiment shown in FIG. 4a, the cross-section flow area at location 70 of the second portion 38 is larger than the cross-section flow area at location 72 of the second portion 38. In the embodiment shown, the location 70 is upstream of the location 72 along the length of the second portion 38 from the inflexion 34 to the conduit end 45. It is however contemplated that the cross-section of the second portion 38 of the conduit 32 could vary in a manner different from described above or could not vary at all, as long as the fuel reaches the conduit end 45. Although the second portion 38 has a circular cross-section, it is contemplated that the second portion 38 should be square, rectangular or oval in cross-section. The first and second portions 36, 38 could have different cross-sections (shapes and dimensions).

Fluid in the conduit 32 travels counter-clockwise when the fuel manifold 22 is seen from the rear face 27 as shown in FIG. 4a. Fluid in the conduit 42 travels in opposite direction from the fluid in the conduit 32, i.e. counter-clockwise when the fuel manifold 22 is seen from the rear face 27 as shown in FIG. 4a.

Figure 5:
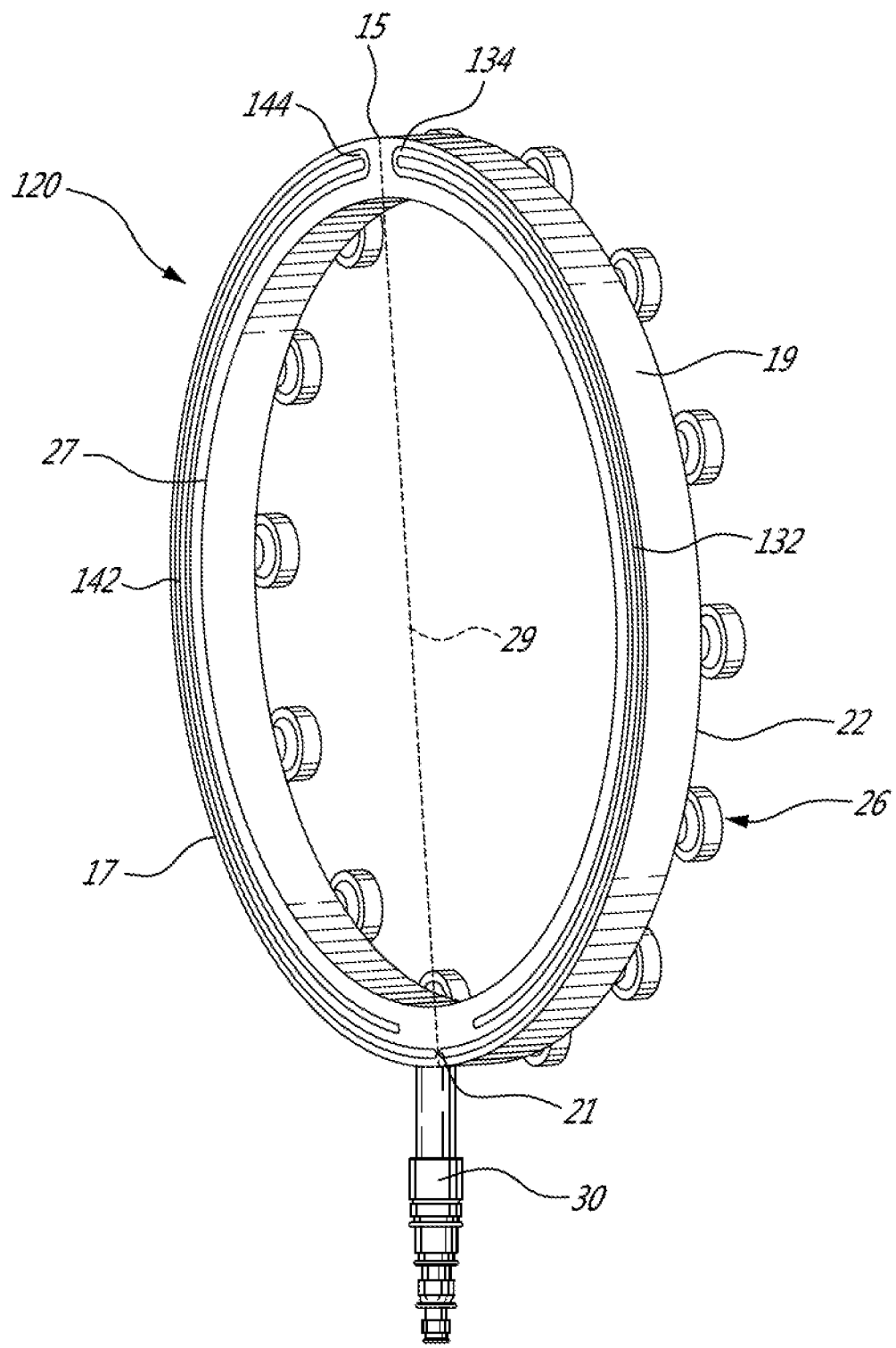
FIG. 5 is a rear perspective view of the fuel manifold of FIG. 2 partially cut-out to reveal conduits of the fuel manifold according to a second embodiment.

Turning now to FIG. 5, the rear face 27 of the fuel manifold 22 is shown cut out to reveal a second embodiment of conduits (or internal passages) 132, 142 of the body 23. The conduits 132, 142 are symmetric with respect to each other relative to the vertical axis 29. The left side 19 receives the conduit 132 only, and the right side 17 receives the conduit 142 only. In this embodiment, the conduits 132, 142 are restricted to one portion of the circumference 28.

Each of the conduits 132, 142 has an arcuate shape, with a respective inflexion 134, 144 disposed at the top 15 of the body 23. The inflexions 34, 44 are elbows (or U-turns), redirecting the flow of fuel at 180 degrees. The inflexions 34, 44 are disposed at a highest point of each of the conduits 132, 142, which is also a point furthest away from the fuel inlet 30. It is contemplated that the inflexions 134, 144 could be disposed away from the vertical axis 29 and/or that the inflexions 134, 144 could be located at a location in the fuel manifold 22 between the top 15 and the bottom 21 of the body 23. For example they could be at a mid-height of the fuel manifold 22.

The conduits 132, 142 are fluidly independent from one another, and carry fuel from the inlet 30 to the injection nozzles 26b on the left 19, and the injection nozzles 26a on the right 17 side of the body 23, respectively. The conduits 132, 142 being similar, only the conduit 132 will now be described in further detail.

With reference to FIGS. 6a and 6b, the conduit 132 includes a first portion 136 (shown solid in FIG. 6b) and a second portion 138 (shown dotted in FIG. 6b). The first and second portions 136, 138 are fluidly connected to each other at the inflexion 134. The first portion 136 is disposed radially outwardly relative to the second position 138, and both lie in a common plane that is perpendicular to the central longitudinal axis 11 of the engine 10. It is contemplated, however, that the first portion 136 could be disposed inwardly relative to the second position 138. It is also contemplated that the first portion 136 and second portions 138 could cross (without fluidly connecting) each other. The first portion 136 could for example have a substantially zigzag shape, thus extending on each side of the second portion 138. The first and second portions 136, 138 could also be in a same plane perpendicular to the front 25 and rear faces 27 of the fuel manifold 22.

The first portion 136 extends from an inlet end 141 proximal to the inlet 30 up to the inflexion 134. As such, the first portion 136 runs through the entire left side 19 of the body 23. The end 141 is a lowest point of the conduit 132 and is disposed about opposite to the inflexion 134 on the vertical axis 29. It is contemplated that the inlet end 141 could not be opposite to the inflexion 134. For example, the inlet end 141 could be at about 15 degrees from the vertical 29. Fuel travels upwardly in the first portion 136 (indicated by arrow 156) until it reaches the inflexion 134. Fuel exits the first portion 136 of the conduit 132 only at the inflexion 134. The first portion 136 is not directly connected to any of the injection nozzles 26b of the left side 19. All the fuel entering the first portion 136 exits the first portion 136. As such, the first portion 136 is continuous and has only a single exit, namely the inflexion 134. Fuel flowing in the first portion 136 of the conduit 132 cools the body 23 of the fuel manifold 22 before reaching the downstream second portion 138 and the injection nozzles 26b. Cooling of the fuel manifold 22, avoids high wetted wall and fuel temperatures. The cross-section of the first portion 136 of the conduit 132 is constant along the length of the first portion 136 from the inlet end 141 to the inflexion 134. It is however contemplated that the cross-section of the first portion 136 could vary as long as the fuel reaches the inflexion 134 and feeds the second portion 138.

The second portion 138 extends between the inflexion 134 and a conduit end 145 of the conduit 132. The fuel traveling in the second portion 138 travels downwardly (as indicated by arrow 160). Because of the 180 degree elbow shape of the inflexion 134, flow in the second portion 138 is in opposite direction from the flow in the first portion 136. The second portion 138 is connected the injection nozzles 26b of the left side 19 of the body 23 exclusively. In the embodiment shown herein, the second portion 138 is connected to seven injection nozzles 26b. Enough fluid has to be provided to the second portion 138 of the conduit 132 so that every injection nozzle 26b on the left side 19 is feed with an adequate amount of fuel. The injection nozzles 26b expel the fuel to the combustor 16 (arrows 162, only one being referred to avoid cluttering the drawings). The fuel injected in the conduit 132 can't access the injection nozzles 26b of the left side 19 until the fuel has flown through the first portion 136 and turned at the inflexion 134. The fuel injected in the conduit 132 whether the first portion 135 or the second portion 138 does not access any of the injection nozzles 26a of the right side 17, as this is achieved by the conduit 142 exclusively.

In order to ensure that the fuel reaches each of the fuel injection nozzles 26b at a desired velocity, the cross-section of the second portion 138 of the conduit 132 may decrease along the length of the second portion 138 from the inflexion 134 to the conduit end 145. This decrease in cross-section of the second portion 138, which may be continuous and gradual, is designed to maintain the velocity of the fuel substantially constant through the second portion 138. It is however contemplated that the cross-section of the second portion 138 of the conduit of the fuel manifold 22 could vary in a manner different from described above or could not vary at all, as long as the fuel reaches the conduit end 145.

With reference to FIG. 7, a method 60 for delivering fuel to the combustor 16 using the manifold 22 will now be described. The method 60 will be shown applied to the conduit 32 as one example of configuration where it could be applied. Flows though the conduits 42, 132, 142 are similar to the one through the conduit 32, and could be used with the method 60.

The method 60 starts at step 62 with injecting fuel to the conduit 32 of the fuel manifold 22. Fuel is introduced via the inlet 30, as indicated by arrow 52 and is diverted into the inlet end 241 of the first portion 36 (arrow 54). At step 64, fuel is directed through the first portion 36 of the conduit 32, thereby at least partially cooling the fuel manifold 22. Fuel travels upwardly through the first portion 36 as indicated by arrow 56, until it reaches the inflexion 34. At step 66, fuel is directed through the inflexion 34 where it undergoes a change of direction from upwards to downwards. Because the first portion 36 of the conduit 32 is continuous and has a single exit at the inflexion 34, all of a given volume of fuel that is introduced into the first portion 36 exits the first portion 36 (i.e. flow through the first portion 36 is uninterrupted and none is diverted off for feeding fuel injectors or otherwise). Accordingly, fuel is permitted to flow through a portion of the fuel manifold 22, in this case approximately half of the diameter of the manifold ring 22, before being fed to some of the nozzles 26, in this case the nozzles 26a for injection. At the inflexion 34 the fuel changes direction (in the case of the conduits shown herein it reverses direction) and enters the second portion 38. At step 68, the fuel is directed through the second portion 38 of the conduit 32. In the second portion 38, the fuel now travels downwardly (arrow 60) with the help of gravity. At step 69, the fuel exits at those ejecting nozzles 26a on the right side 17 while traveling in the second portion 38 of the conduit 32. Fuel feeds the injection nozzles 26a as it encounters them during its travel toward the conduit end 45.

With the configuration described above, no additional coolant is necessary (although coolant may be added to the fuel manifold 22). The fuel itself is cooled down before being circulated back into the fuel manifold 22 to feed the injection nozzles 26. This may ensure more consistent cooling of the fuel and of the manifold 22.

It should be understood that for a given embodiment, the conduits 32, 42 (resp. 132, 142) may be operated simultaneously or in a sequential manner, depending on the needs of the engine 10.

The above description is meant to be exemplary only, and one skilled in the art will recognize that changes may be made to the embodiments described without departing from the scope of the invention disclosed. For example, the fuel manifold may have only one conduit to feed all the injection nozzles. The conduit may be ring shaped and the inflexion may be the lowest point of the conduit and may be located adjacent to the fuel inlet. In another example, there may be more than two conduits, for example three, thereby feeding each one of three groups of injection nozzles. Although the present is described for an internal fluid manifold, it is contemplated that the conduits described herein could be applied to an external manifold. Still other modifications which fall within the scope of the present invention will be apparent to those skilled in the art, in light of a review of this disclosure, and such modifications are intended to fall within the appended claims.

The invention claimed is:

1. A method for delivering fuel to a combustor of a gas turbine engine, the method comprising:
    injecting fuel into a conduit of a fuel manifold via a conduit inlet, the fuel manifold having a ring-shaped body;
    directing the fuel through a continuous first portion of the conduit extending between the conduit inlet and an inflexion of the conduit, the first portion of the conduit disposed in a first half of the ring-shaped body;
    directing the fluid through the inflexion of the conduit, the inflexion forming a single exit of the first portion and being U-shaped, the inflexion located opposite from the conduit inlet relative to the ring-shaped body;
    directing the fuel through a second portion of the conduit in serial flow communication with the first portion, the second portion of the conduit extending downstream from the inflexion, wherein fuel flowing in the second portion flows in a direction opposite to that of the fuel flowing in the first portion, the second portion of the conduit disposed in said first half of the ring-shaped body; and
    as the fuel flows through the second portion of the conduit, exiting the fuel from the second portion of the conduit into a first group of fuel injection nozzles in exclusive fluid flow communication with the second portion for ejection into the combustor of the gas turbine engine.

2. The method as defined in claim 1, further comprising at least partially cooling the fuel manifold as a result of directing the fuel through the first portion of the conduit.

3. The method as defined in claim 1, further comprising flowing the fuel at a constant velocity as the fuel flows through the second portion of the conduit.

4. The method as defined in claim 1, further comprising:
    injecting fuel into a second conduit of the fuel manifold via the conduit inlet;
    directing the fuel through a continuous first portion of the second conduit extending between the conduit inlet and an inflexion of the second conduit, the first portion of the second conduit disposed in a second half of the ring-shaped body of the fuel manifold;
    directing the fluid through the inflexion of the second conduit, the inflexion of the second conduit forming a single exit of the first portion of the second conduit and being U-shaped, the inflexion of the second conduit located opposite from the conduit inlet relative to the ring-shaped body;

directing the fuel through a second portion of the second conduit in serial flow communication with the first portion of the second conduit, the second portion of the second conduit extending downstream from the inflexion of the second conduit, wherein fuel flowing in the second portion of the second conduit flows in a direction opposite to that of the fuel flowing in the first portion of the second conduit, the second portion of the second conduit disposed in said second half of the ring-shaped body; and as the fuel flows through the second portion of the second conduit, exiting the fuel from the second portion of the second conduit into a second group of fuel injection nozzles in exclusive fluid flow communication with the second portion of the second conduit for ejection into the combustor of the gas turbine engine.

* * * * *